United States Patent [19]
Schmitz et al.

[11] Patent Number: 5,747,578
[45] Date of Patent: May 5, 1998

[54] HETEROGENEOUS VINYL ACETATE/ETHYLENE DISPERSION

[75] Inventors: Ludwig Schmitz, Frankenthal; Stefan Hess, Gross-Gerau; Bettina Gerharz, Mainz, all of Germany

[73] Assignee: Clariant GmbH, Frankfurt, Germany

[21] Appl. No.: 681,968

[22] Filed: Jul. 30, 1996

[30] Foreign Application Priority Data

Aug. 2, 1995 [DE] Germany .................. 195 28 380.5

[51] Int. Cl.$^6$ .......................... C08L 31/04; C08F 218/08
[52] U.S. Cl. ................ 524/502; 524/503; 524/556; 524/561; 524/563; 524/803; 524/822; 526/330; 526/331; 526/329.5
[58] Field of Search .................. 524/502, 503, 524/556, 561, 563, 822, 803; 526/330, 331, 329.5

[56] References Cited

U.S. PATENT DOCUMENTS

| | | | |
|---|---|---|---|
| 3,661,696 | 5/1972 | Knutson | 524/460 |
| 3,883,489 | 5/1975 | Matschke et al. | 260/78.5 |
| 4,287,329 | 9/1981 | Heimberg | 524/503 |

FOREIGN PATENT DOCUMENTS

| | | |
|---|---|---|
| 0 444 827 | 9/1991 | European Pat. Off. . |
| 0 586 966 | 3/1994 | European Pat. Off. . |

OTHER PUBLICATIONS

Dr. J. Schulze, Burghausen D, "Redispersionspulver in Zement", TIZ Fachberichte, vol. 109, No. 9, 1985, pp. 698–703.

*Primary Examiner*—Vasu Jagannathan
*Assistant Examiner*—Olga Asinovsky
*Attorney, Agent, or Firm*—Foley & Lardner

[57] ABSTRACT

A copolymer in dispersion or redispersible powder form which is stabilized by a protective colloid and has a glass transition temperature of −40° to 10° C. and an ethylene content of at least 30% by weight, based on the total amount of monomers, with a heterogeneous build-up of the copolymer particles, including a first polymer phase, which includes vinyl acetate and >40% by weight of ethylene, based on the total amount of monomers in this phase, and a last copolymer phase, which includes vinyl acetate and 5 to 40% by weight of ethylene, based on the total amount of monomers in this phase, is suitable, for example, as a binder in building materials.

19 Claims, No Drawings

HETEROGENEOUS VINYL ACETATE/ETHYLENE DISPERSION

BACKGROUND OF THE INVENTION

1. Field of the Invention

The invention relates to heterogeneously built-up vinyl acetate/ethylene copolymers in dispersion form or redispersible powder form, their preparation, and their use, for example, as binders in building material formulations, in particular in sealing slurries.

2. Description of Related Art

Copolymers have been employed for many years in the building sector as a polymer improving agent for hydraulically setting systems, preferably in the form of dispersion powders. An overview of the action of dispersion powders in such building materials is to be found in the journal Tonindustrie TIZ 9, 1985, page 698. Substantial improvements in the properties of adhesion, abrasion resistance, scratch resistance, and flexural tensile strength are achieved by the addition of dispersion powders.

Dispersion powders are prepared by spray drying aqueous polymer dispersions with the addition of polyvinyl alcohol and other additives. The produced redispersible powder products preferably have a good storage stability. The readily free-flowing powder generally with particle sizes of between 10 and 250 µm, redisperses in water again to give the original dispersion with particle sizes of usually between 0.1 and 10 µm.

The great advantage of dispersion powders over liquid dispersions which can likewise alternatively be employed is that dry mortar mixtures which only have to be mixed with water on the building site can be prepared. This procedure brings many advantages, such as increased work safety, safe handling, or simple disposal of drums.

Redispersible dispersion powders based on the monomers vinyl acetate and ethylene have the advantage that polymers having a minimum film-forming temperature of about 0° C. and a glass transition temperature (Tg) below 0° C. can be prepared without the use of plasticizers or film-forming auxiliaries.

Dispersion powders with a low glass transition temperature (Tg<−10° C.) furthermore have the advantage that the "inorganic content" (sand and cement) of low elasticity in the building material formulation can be elastified by the content of plastic even at a low use temperature, so that the use properties of such materials can be considerably improved. Nevertheless, dispersion powders with a low glass transition temperature show an increased tendency to block, so that the preparation of storage-stable products presents problems.

DE-C 22 14 410 describes vinyl acetate/ethylene copolymer dispersion powders which are based on dispersions which have been synthesized under ethylene pressures of up to 100 bar. A monomer feed process in which vinyl acetate or mixtures of vinyl acetate and other olefinically unsaturated monomers are metered into an aqueous liquor in the presence of a certain ethylene pressure is preferably used here. The ethylene pressure can be kept constant during the entire metering time, but the process can also be carried out under an increasing or decreasing pressure. The vinyl acetate/ethylene copolymer dispersion powders described in the examples of DE-C 22 14 410 comprise a maximum of 25% of ethylene in the polymer.

The publication EP-A 0 444 827 describes a heterogeneous ethylene/vinyl acetate copolymer which comprises 10 to 30% by weight of ethylene in the core material, while the ethylene content in the shell material should be as low as possible. The polymer dispersions obtained according to EP-A 0 444 827 are not suitable for the preparation of dispersion powders.

Patent Application EP-A 0 586 966 also describes a heterogeneous ethylene/vinyl acetate copolymer which is obtained in a two-stage polymerization process. The second polymerization stage is in all cases carried out under normal pressure in the absence of ethylene. The copolymers obtained according to EP-A 0 586 966 also cannot be converted into storage-stable dispersion powders.

SUMMARY OF THE INVENTION

It was therefore an object of the present invention to provide copolymers for storage-stable, redispersible and free-flowing dispersion powders with a glass transition temperature of −40° to 10° C. which can be used as binders in building material formulations.

It is also an object of the present invention to provide methods of making such copolymers and methods of using such copolymers.

In accordance with these objectives, there is provided a copolymer in dispersion or redispersible powder form which is stabilized by a protective colloid and has a glass transition temperature of −40° to 10° C. and an ethylene content of at least 30% by weight, based on the total weight of monomers, with a heterogeneous build-up of the copolymer particles, comprising a first copolymer phase, which comprises vinyl acetate and >40% by weight of ethylene, based on the total weight of monomers in this phase, and which preferably has a glass transition temperature of −40° to 0° C., if polymerized separately, and a second copolymer phase, which comprises vinyl acetate and 5 to 40% by weight of ethylene, based on the total weight of monomers in this phase, and which preferably has a glass transition temperature of −10° to 50° C., if polymerized separately.

In accordance with these objectives, there is also provided a method of making a copolymer as described above, which comprises first copolymerizing a portion of the monomers by free radical copolymerization under an ethylene pressure of 55 to 150 bar in the presence of the protective colloid to form the first phase, optionally, subsequently polymerizing a further portion of the monomers, and then copolymerizing the remainder of the monomers by free radical copolymerization under an ethylene pressure of between 1 and 55 bar to form the second phase, and optionally then spray drying the product.

Further objects, features, and advantages of the invention will become apparent from the detailed description of preferred embodiments that follows.

DETAILED DESCRIPTION OF PREFERRED EMBODIMENT

The present invention relates to a copolymer comprising vinyl acetate, at least 30% by weight of ethylene and, if appropriate, other monomers, such as vinyl esters, acrylic acid, acrylic acid esters, methacrylic acid, methacrylic acid esters and maleic acid diesters, which can be obtained in a multi-stage copolymerization process in the presence of a protective colloid and which comprises a first ethylene-rich phase incorporating ethylene in a proportion of more than 40% by weight and another phase having a lower ethylene content.

The present invention relates to a copolymer in dispersion form or, preferably, redispersible powder form which is stabilized by a protective colloid and has a glass transition temperature of −40° to 10° C. and an ethylene content of at least 30% by weight, based on the total amount of monomers, with a heterogeneous build-up of the copolymer particles, comprising a first, preferably partly crystalline copolymer phase which comprises vinyl acetate and >40% by weight of ethylene, based on the total amount of monomers in this phase, and which preferably has a glass transition temperature of −40° to 0° C., particularly of −30° to −10° C., and generally a melting range of 0° to 80° C., if polymerized separately, and a second copolymer phase, which comprises vinyl acetate and 5 to 40% by weight of ethylene, based on the total amount of monomers in this phase, and which preferably has a glass transition temperature of −10° to 50° C., particularly of 10° to 40° C., if polymerized separately.

The copolymers according to the invention are preferably built up, in each case based on the total amount of monomers employed, from at least 50% by weight, in particular at least 75% by weight, of monomer units of vinyl acetate and ethylene and up to 50% by weight, in particular up to 25% by weight, of optional comonomers such as those previously mentioned and vinyl esters of aliphatic ($C_3$–$C_{18}$)-carboxylic acids, acrylic acid esters, methacrylic acid esters and maleic acid diesters of aliphatic ($C_1$–$C_{18}$)-alcohols and monomers which carry sulfonate groups, α,β-unsaturated carboxylic acids, methacrylic acid esters or acrylic acid esters which carry epoxy or hydroxyl groups and monomers which carry N-methylol groups, as well as any other desired monomers which can be copolymerized with ethylene and vinyl acetate.

The copolymers according to the invention preferably comprise 30 to 70% by weight, in particular 50 to 65% by weight, of vinyl acetate and 30 to 70% by weight, in particular 35 to 50% by weight, of ethylene, based on the total amount of monomers employed.

Suitable vinyl esters which are optionally used are preferably vinyl esters of aliphatic monocarboxylic acids having 3 to 12 carbon atoms, for example vinyl propionate, vinyl butyrate, vinyl caproate, vinyl laurate, vinyl decanoate and vinyl esters of Versatic® acid (α,α-dialkyl-branched monocarboxylic acid, Shell-Chemie), for example Veova® 10 and Veova® 11. The content of these comonomers is preferably 0 to 30% by weight, in particular 5 to 25% by weight, based on the total amount of monomers employed.

Suitable acrylates and methacrylates optionally used are preferably acrylic acid esters of monohydric alcohols having 1 to 12 carbon atoms, for example methyl acrylate, ethyl acrylate, butyl acrylate and 2-ethylhexyl acrylate, and methacrylic acid esters of monohydric alcohols having 1 to 12 carbon atoms, for example methyl methacrylate, ethyl methacrylate, butyl methacrylate and 2-ethylhexyl methacrylate. Suitable maleic acid diesters are preferably esters of monohydric aliphatic alcohols having 1 to 12 carbon atoms, for example dibutyl maleate, dihexyl maleate, and dioctyl maleate. The alcohol radicals of the acrylic and methacrylic acid esters and maleic acid diesters can include linear or branched alkyl chains. The content of these comonomers is generally 0 to 30% by weight, preferably 5 to 25% by weight based on the total weight of monomers employed.

The copolymers according to the invention may include 0 to 1% by weight, preferably 0.1 to 0.5% by weight, based on the total amount of monomers employed, of acrylic acid and/or methacrylic acid as α,β-unsaturated carboxylic acids.

The methacrylic or acrylic acid esters which are modified by epoxide groups or hydroxyl groups and are optionally contained in the copolymers according to the invention are preferably glycidyl methacrylate, hydroxyethyl methacrylate, hydroxyethyl acrylate, hydroxypropyl acrylate, hydroxypropyl methacrylate, and N-methylolacrylamide. The content of these comonomers is generally 0 to 1% by weight, preferably 0.05 to 0.5% by weight, based on the total amount of monomers employed.

In addition to the monomer units mentioned above, the copolymers according to the invention can furthermore comprise olefinically unsaturated compounds, such as ($C_3$–$C_{12}$)-α-olefins, for example propylene or isobutylene, vinyl ethers, for example vinyl ethyl ether or vinyl n-butyl ether, and acrylonitrile, methacrylonitrile, vinyl chloride or N-vinylpyrrolidone. These units are generally used in an amount of 0 to 10% by weight, preferably 1 to 5% by weight, based on the total amount of monomers employed.

Monomer units which contain silicon, for example vinyltrimethoxysilane or vinyltriethoxysilane, can furthermore be present in the dispersion polymers, generally in an amount of 0 to 2% by weight, preferably 0.05 to 0.5% by weight, in particular 0.1 to 0.25% by weight, based on the total amount of monomers employed.

The copolymer according to the invention can also have a wide glass transition range and a second glass transition temperature or a melting range, as long as a minimum film-forming temperature of preferably <5° C., in particular of ≦0° C., is achieved.

The copolymers according to the invention are stabilized by protective colloids. Any desired protective colloids can be used. Examples of suitable protective colloids include etherified cellulose, water-soluble starches, polyvinylpyrrolidone and polycarboxylic acids. The preferred colloids are one or more polyvinyl alcohols which have, in particular, a degree of hydrolysis of 60 to 100 mol % and a viscosity of a 4% strength by weight aqueous solution of 2 to 70 mPa.s, measured at 20° C. The polyvinyl alcohols can also be functionalized, for example, by sulfonic acid groups, carboxylic acid groups, acetal groups, and/or amino groups. The proportion of the protective colloids, based on the total weight of the copolymer, is preferably 2 to 20% by weight, in particular 5 to 15% by weight.

Customary anionic, nonionic or cationic emulsifiers can furthermore be optionally co-used as costabilizers. The emulsifiers in general are initially introduced into the mixture before the polymerization. Their proportion can be up to 3% by weight, preferably 0.5 to 3% by weight, based on the total weight of the copolymer composition.

The particle size of the polymer particles and the solid content of the dispersion can be controlled as desired. The particle size of the polymer particles of the copolymers according to the invention in the dispersion form is generally in the range from 0.02 to 10 μm, preferably in the range from 0.1 to 5 μm. The solids content of the dispersions is generally 40 to 65% by weight, preferably 45 to 60% by weight.

The present invention also relates to a process for the preparation of the copolymers according to the invention by polymerization of vinyl acetate and ethylene and, optionally, comonomers such as described above, which can be added at any time during polymerization and can be part of either phase, and which include vinyl esters of aliphatic ($C_3$–$C_{18}$) carboxylic acids, acrylic acid esters, methacrylic acid esters and maleic acid diesters of aliphatic ($C_1$–$C_{18}$) alcohols, monomers which carry sulfonate groups, α,β-unsaturated carboxylic acids, methacrylic acid esters or acrylic acid esters which carry epoxide or hydroxyl groups and monomers which carry N-methylol groups, which comprises first copolymerizing a portion of the monomers by free radical copolymerization under an ethylene pressure of 55 to 150 bar in the presence of a protective colloid, if appropriate subsequently polymerizing a further portion of the monomers, and finally copolymerizing the remainder of the monomers by free radical copolymerization under an ethylene pressure of between 1 and 55 bar, and if appropriate then spray drying the product.

The preparation of the dispersion preferably takes place in a pressure autoclave. For this, the monomers can be added continuously or discontinuously, at the desired reaction temperature, to an aqueous solution of the protective colloid or of the protective colloid/emulsifier mixture, all or some of which has been initially introduced into the reaction vessel.

Free radical initiators which can be employed for the polymerization of the comonomers are all the polymerization initiators which form free radicals, in the customary amounts. Suitable initiators include, for example, alkali metal and ammonium salts of peroxy acids, such as potassium persulfate, sodium persulfate and ammonium persulfate, and redox catalysts, for example combinations of ammonium persulfate and ammonium hydrogen sulfate or hydrogen peroxide and ascorbic acid or hydrogen peroxide and iron (II) salts, and tert-butyl hydroperoxide and sodium formaldehyde-sulfoxylate. Organic peroxides, percarbonates and azo compounds, preferably dibenzoyl peroxide, azoisobutyronitrile, tert-butyl peroxydiethyl acetate and tert-butyl peroxy-2-ethyl hexanoate, can furthermore also be employed. The amount of initiators employed is generally from 0.1 to 2% by weight, preferably 0.2 to 1% by weight, based on the monomers. The initiators listed can also be used as a mixture.

The monomers with the exception of ethylene, can be metered into the reaction vessel in the form of a monomer mixture or in the form of a monomer emulsion. In the case of a monomer emulsion, it can be stabilized by a protective colloid and/or emulsifier. Emulsifiers which are preferably employed are anionic or nonionic emulsifiers. In the preparation of the dispersion, all or a portion of the initiator systems listed can be initially introduced into the reaction autoclave, or a portion can be metered in with the monomer emulsion or as a solution. The monomers can be polymerized continuously or discontinuously, that is to say by metering, in a batch process or else in a combined batch/metering process. Preferably, up to 50% by weight, particularly up to 20% by weight, and especially preferably 5 to 20% by weight, of the monomers, with the exception of ethylene, are initially introduced into the reaction vessel and the remainder is metered in continuously or discontinuously during the polymerization.

The ethylene is metered into the reaction vessel in gaseous form, preferably at a reaction temperature of 45° to 90° C., in particular of 50° to 85° C., and for the first part of the copolymerization preferably under an ethylene pressure in the range from 60 to 120 bar, in particular from 65 to 95 bar, and for the last part of the dispersion polymerization preferably at a pressure in the range from 1 to 45 bar, in particular, during 90% of the total reaction time, from 5 to 40 bar. For this, in particular, the ethylene supply is stopped towards the end of the first polymerization stage, so that the ethylene pressure required in the last polymerization stage can be established in the course of the polymerization. The ethylene pressure can be kept constant in the particular stage during the heterogeneous multi-stage polymerization, or can be varied within the particular pressure range.

A dispersion which, in spite of the very low glass transition range of the polymer, can be sprayed to provide a highly flexible dispersion powder which has a very good storage stability and is readily free-flowing, due to the controlled heterogeneous build-up of the latex particles, can be prepared by the multi-stage polymerization of the invention, which leads to dispersion particles having an ethylene-rich phase and a low-ethylene phase. This profile of properties arises as a result of the high flexibility of the soft ethylene-rich phase with a far-reaching gradient of the glass transition range, in combination with the hard low-ethylene phase. Surprisingly, this pattern of properties is virtually independent of the molar mass of the resulting copolymer.

The copolymers according to the invention can preferably be preserved in the dispersion form by customary processes, in order to protect them from attack by fungi and bacteria. If desired, only very small amounts of biocidal additives need to be used for the preservation. On the other hand, preservation can be achieved by heating the finished agent to temperatures of 60° to 120° C. for 15 to 120 minutes, for example by pasteurization or tyndallization (fractional sterilization), and furthermore by cooling, as well by exclusion of air during storage in gas-tight drums under an inert gas. Ultrasound, UV irradiation and high-frequency fields can also be used for the preservation. Additions of minimal amounts of antibiotics, for example terramycin, streptomycin and subtilin, are furthermore suitable, as is quinosol (equimolar compound of o-hydroxyquinoline sulfate and potassium sulfate). Chloroacetamide, sodium benzoate, the methyl, ethyl and propyl esters of p-hydroxybenzoic acid and sodium compounds thereof, sodium sorbate, sodium formate, sodium borate as well as borax, hydrogen peroxide, lactic acid, formic acid, propionic acid, nitrites and nitrates, salicylic acid, dehydroacetic acid, thymol (methylisopropylphenol), barium metaborate, dithiocarbamates, chloromethylisothiazolinone and benzisothiazolinone can furthermore be employed as preservatives in active amounts.

The present invention also relates to the use of the copolymers according to the invention, preferably in the form of dispersion powders, as binders in building materials, preferably sealing slurries.

The copolymers according to the invention fulfill the properties of a highly flexible binder, which is thus stable at low temperatures, in sealing slurries, and to −30° C., preferably down to −25° C., when used both from the starting dispersion and from the re-emulsion of the powder prepared therefrom. They are extremely stable to possible additives, for example, quartz sand, gypsum, chalks, metal salts, and plasticizers. The sealing slurries preferably comprise between 5 and 40%, in particular 10 to 25%, by weight based on the total weight of the slurry, of the copolymer as a binder.

The copolymers according to the invention can subsequently optionally be modified further. For this, for example, water-soluble copolymers based on acrylic or methacrylic acid, such as acrylic acid/acrylamide and methacrylic acid/acrylic acid ester copolymers, for example also water-soluble copolymers based on styrene/maleic anhydride, ethylene/maleic anhydride, ethylene/acrylic acid, and ethylene/methacrylic acid, cellulose derivatives, such as methylcellulose, hydroxyethylcellulose and carboxymethylcellulose, or casein, gum arabic, tragacanth gum, starch, sodium alginate, polyvinyl alcohol, polyvinylpyrrolidone or sodium polyacrylate, can be added to the copolymer.

The invention is further described with reference to the following examples. The examples are for illustrative purpose and do not limit the scope of the invention.

EXAMPLES

The parts and percentages used in the following examples relate to the weight, unless noted otherwise.

The examples and comparison examples are carried out in a 30 l pressure autoclave with jacket cooling and an approved pressure range up to 160 bar.

The viscosity of the dispersions was determined using a Haake rotary viscometer (Rheomat® VT 500) at a shear gradient of $D=17.93\ s^{-1}$.

The particle size and the particle size distribution were determined by laser and white light aerosol spectroscopy. The particle sizes stated correspond to the particle diameter after drying.

The glass transition temperatures are determined by DSC measurement on a Perkin-Elmer 7 at a heating rate of 20K/minute.

The data on the ethylene content are based on the relative weight content of ethylene of the monomer units in the copolymer. The ethylene content in the copolymers is calculated from the weight of solids of the copolymer minus the amounts of all the starting substances except ethylene.

Example 1

A solution, brought to a pH of 5.0 with acetic acid, of 500 g of polyvinyl alcohol having a viscosity of a 4% strength aqueous solution at 20° C. of about 18 mPa.s and a degree of hydrolysis of about 88 mol %, 1000 g of polyvinyl alcohol having a viscosity of a 4% strength aqueous solution at 20° C. of about 8 mPa.s and a degree of hydrolysis of about 88 mol %, 50.8 g of anhydrous sodium acetate, 12.7 g of sodium disulfite and 8800 g of water is introduced into a 30 l pressure reaction vessel with a temperature-regulating device and stirrer.

The reactor is flushed with nitrogen and ethylene in order to remove essentially all the oxygen. The stirrer is then set at 150 revolutions/minute, 640 ml of vinyl acetate are added to the batch, the contents of the tank are heated to 40° C., 25% of a solution of 50 g of ammonium persulfate in 1000 g of water are added at 40° C. and the contents of the tank are heated to 60° C. During the heating-up operation, ethylene is added up to a pressure of 85 bar.

When an internal temperature of 60° C. is reached, the six-hour metering of 3640 ml of vinyl acetate in parallel with the initiator solution is started at an internal temperature of 60° C. under an ethylene pressure of 85 bar. A further 65% of the ammonium persulfate solution are metered in linearly over 8 hours, and the remaining 10% are then added all at once. When the vinyl acetate I feed has ended after 6 hours, the ethylene supply is stopped and a further 2000 ml of vinyl acetate II are metered in linearly over a period of 2 hours. When the metering has ended, the mixture is allowed to after-react at 60° C. for one hour and the batch is then heated up to 80° C. in the course of 60 minutes and, when the reaction has ended, cooled after a further hour.

Characteristic data:
Solids: 44.0%
Ph: 4.5
Viscosity: 16.7 Pa.s
Particle size distribution: 100–2500 nm
Ethylene content: 33.4%
Glass transition points: −25°/14° C.

Example 2

A solution, brought to a pH of 5.0 with acetic acid, of 500 g of polyvinyl alcohol having a viscosity of a 4% strength aqueous solution at 20° C. of about 18 mPa.s and a degree of hydrolysis of about 88 mol %, 1000 g of polyvinyl alcohol having a viscosity of a 4% strength aqueous solution at 20° C. of about 8 mPa.s and a degree of hydrolysis of about 88 mol %, 50.8 g of anhydrous sodium acetate, 12.7 g of sodium disulfite and 8800 g of water is introduced into a 30 l pressure reaction vessel with a temperature-regulating device and stirrer.

The reactor is flushed with nitrogen and ethylene in order to remove essentially all the oxygen. The stirrer is then set at 150 revolutions/minute, 640 ml of vinyl acetate are added to the batch, the contents of the tank are heated to 40° C., 25% of a solution of 50 g of ammonium persulfate in 1000 g of water are added at 40° C. and the contents of the tank are heated to 60° C. During the heating-up operation, ethylene is added up to a pressure of 85 bar.

When an internal temperature of 60° C. is reached, the six-hour metering of 3640 ml of vinyl acetate in parallel with the initiator solution is started at an internal temperature of 60° C. under an ethylene pressure of 85 bar. A further 65% of the ammonium persulfate solution are metered in linearly over a period of 9 hours, and the remaining 10% are added all at once after the end of the metering of the monomer. When the vinyl acetate I feed has ended after 6 hours, the ethylene supply is stopped and a further 2000 ml of vinyl acetate II and III are added over a period of 3 hours as follows:

Vinyl acetate II (1000 ml) is metered in linearly over a period of 2 hours and vinyl acetate III (1000 ml) is metered in linearly in the course of one hour. When the metering has ended, the mixture is allowed to after-react at 60° C. for one hour and the batch is then heated up to 85° C. in the course of 60 minutes and, when the reaction has ended, cooled after a further hour. The final ethylene pressure is 39.0 bar.

Characteristic data:
Solids: 46%
pH: 4.3
Viscosity: 16.2 Pa.s
Particle size distribution: 100–3000 nm
Ethylene content: 39.8%
Glass transition points: −26°/20° C.

Example 3

A solution, brought to a pH of 5.0 with acetic acid, of 500 g of polyvinyl alcohol having a viscosity of a 4% strength aqueous solution at 20° C. of about 18 mPa.s and a degree of hydrolysis of about 88 mol %, 1000 g of polyvinyl alcohol having a viscosity of a 4% strength aqueous solution at 20° C. of about 8 mPa.s and a degree of hydrolysis of about 88 mol %, 50.8 g of anhydrous sodium acetate, 12.7 g of sodium disulfite and 8800 g of water is introduced into a 30 l pressure reaction vessel with a temperature-regulating device and stirrer. An emulsifier Pluronic® L60 (EO/PO block polymer, BASF) (152.8 g) is additionally introduced into the initial mixture.

The reactor is flushed with nitrogen and ethylene in order to remove essentially all the oxygen. The stirrer is then set at 150 revolutions/minute, 640 ml of vinyl acetate are added to the batch, the contents of the tank are heated to 40° C., 25% of a solution of 50 g of ammonium persulfate in 1000 g of water are added at 40° C. and the contents of the tank are heated to 60° C. During the heating-up operation, ethylene is added up to a pressure of 85 bar.

When an internal temperature of 60° C. is reached, the six-hour metering of 3640 ml of vinyl acetate in parallel with the initiator solution is started at an internal temperature of 60° C. under an ethylene pressure of 85 bar. A further 65% of the ammonium persulfate solution are metered in linearly over a period of 8 hours, and the remaining 10% are added all at once after the end of the metering of the monomer. When the vinyl acetate I feed has ended after 6 hours, the ethylene supply is stopped and a further 2000 ml of vinyl acetate II and III are added over a period of 3 hours as follows:

Vinyl acetate II (1000 ml) is metered in linearly over a period of 2 hours and vinyl acetate III (1000 ml) is metered in linearly in the course of one hour. When the metering has ended, the mixture is allowed to after-react at 60° C. for one hour and the batch is then heated up to 85° C. in the course of 60 minutes and, when the reaction has ended, cooled after a further hour. The final ethylene pressure is 35.0 bar.

Characteristic data:

Solids: 45% pH: 4.1

Viscosity: 8.8 Pa.s

Particle size distribution: 100–2300 nm

Ethylene content: 34.4%

Glass transition points: −25°/0° C.

Example 4

A solution, brought to a pH of 5.0 with acetic acid, of 500 g of polyvinyl alcohol having a viscosity of a 4% strength aqueous solution at 20° C. of about 18 mPa.s and a degree of hydrolysis of about 88 mol %, 1000 g of polyvinyl alcohol having a viscosity of a 4% strength aqueous solution at 20° C. of about 8 mPa.s and a degree of hydrolysis of about 88 mol %, 50.8 g of anhydrous sodium acetate, 12.7 g of sodium disulfite and 8800 g of water is introduced into a 30 l pressure reaction vessel with a temperature-regulating device and stirrer. An emulsifier Texapon® K12 (n-dodecyl sulfate, Henkel) (21 g) is additionally introduced into the initial mixture.

The reactor is flushed with nitrogen and ethylene in order to remove essentially all the oxygen. The stirrer is then set at 150 revolutions/minute, 640 ml of vinyl acetate are added to the batch, the contents of the tank are heated to 40° C., 25% of a solution of 50 g of ammonium persulfate in 1000 g of water are added at 40° C. and the contents of the tank are heated to 60° C. During the heating-up operation, ethylene is added up to a pressure of 85 bar.

When an internal temperature of 60° C. is reached, the six-hour metering of 3640 ml of vinyl acetate in parallel with the initiator solution is started at an internal temperature of 60° C. under an ethylene pressure of 85 bar. A further 65% of the ammonium persulfate solution are metered in linearly over a period of 9 hours. The remaining 10% are added all at once after the end of the metering of the monomer. When the vinyl acetate I feed has ended after 6 hours, the ethylene supply is stopped and a further 2000 ml of vinyl acetate II and III are added over a period of 3 hours as follows:

Vinyl acetate II (1000 ml) is metered in linearly over a period of 2 hours and vinyl acetate III (1000 ml) is metered in linearly in the course of one hour. When the metering has ended, the mixture is allowed to after-react at 60° C. for one hour and the batch is then heated up to 85° C. in the course of 60 minutes and, when the reaction has ended, cooled after a further hour. The final ethylene pressure is 32.8 bar.

Characteristic data:

Solids: 47% pH: 4.2

Viscosity: 14.1 Pa.s

Particle size distribution: 100–3000 nm

Ethylene content: 36.3%

Glass transition points: −27°/10° C.

Example 5

A solution, brought to a pH of 5.0 with acetic acid, of 500 g of polyvinyl alcohol having a viscosity of a 4% strength aqueous solution at 20° C. of about 18 mPa.s and a degree of hydrolysis of about 88 mol %, 1000 g of polyvinyl alcohol having a viscosity of a 4% strength aqueous solution at 20° C. of about 8 mPa.s and a degree of hydrolysis of about 88 mol %, 50.8 g of anhydrous sodium acetate, 12.7 g of sodium disulfite and 8800 g of water is introduced into a 30 l pressure reaction vessel with a temperature-regulating device and stirrer. An emulsifier Arkopal® N 300 (nonylphenol ethoxylate with 30 EO units, Hoechst) as a 20% strength solution in an amount of 380 g and 4.3 g of Texapon K12 are additionally introduced into the initial mixture.

The reactor is flushed with nitrogen and ethylene in order to remove essentially all the oxygen. The stirrer is then set at 150 revolutions/minute, 640 ml of vinyl acetate are added to the batch, the contents of the tank are heated to 40° C., 25% of a solution of 50 g of ammonium persulfate in 1000 g of water are added at 40° C. and the contents of the tank are heated to 60° C. During the heating-up operation, ethylene is added up to a pressure of 85 bar.

When an internal temperature of 60° C. is reached, the six-hour metering of 3640 ml of vinyl acetate in parallel with the initiator solution is started at an internal temperature of 60° C. under an ethylene pressure of 85 bar. A further 65% of the ammonium persulfate solution are metered in linearly over a period of 9 hours. The remaining 10% are added all at once after the end of the metering of the monomer. When the vinyl acetate I feed has ended after 6 hours, the ethylene supply is stopped and a further 2000 ml of vinyl acetate II and III are added over a period of 3 hours as follows:

Vinyl acetate II (1000 ml) is metered in linearly over a period of 2 hours and vinyl acetate III (1000 ml) is metered in linearly in the course of one hour. When the metering has ended, the mixture is allowed to after-react at 60° C. for one hour and the batch is then heated up to 85° C. in the course of 60 minutes and, when the reaction has ended, cooled after a further hour. The final ethylene pressure is 16 bar.

Characteristic data:

Solids: 44% pH: 4.3

Viscosity: 10.2 Pa.s

Particle size distribution: 100–2200 nm

Ethylene content: 30.1%

Glass transition points: −25°/12° C.

Example 6

10,800 g of water, 764 g of polyvinyl alcohol having a viscosity of a corresponding 4% strength aqueous solution at 20° C. of about 18 mPa.s and a degree of hydrolysis of about 88 mol %, 764 g of polyvinyl alcohol having a viscosity of a corresponding 4% strength aqueous solution at 20° C. of about 8 mPa.s and a degree of hydrolysis of about 88 mol %, 4.3 g of Texapon K12, 380 g of an aqueous 20% strength solution of Arkopal N300, 12.5 g of sodium disulfite and 50.8 g of sodium acetate are initially introduced into a 30 l pressure reaction vessel with a temperature-regulating device and stirrer. The reactor is flushed with nitrogen and ethylene to essentially remove the oxygen. The stirrer is then set at 150 revolutions/minute, 640 ml of vinyl acetate are metered in and the contents of the tank are heated to 40° C. 250 ml of an initiator solution of 50 g of ammonium peroxodisulfate and 1000 g of water are added rapidly at this temperature and the temperature is then increased to 60° C. During the heating-up phase, ethylene is forced in up to a pressure of 85 bar. 4000 ml of vinyl acetate are metered in linearly in the course of 8 hours. During this procedure, the ethylene supply is stopped after a polymerization time of 6 hours. At the end of the 8-hour polymerization phase, a further 1000 ml of vinyl acetate are metered in linearly in the course of one hour. In parallel with the addition of vinyl acetate, 600 ml of initiator solution are metered in linearly over the entire period of 9 hours. After the end of the metering, the remaining 150 ml of initiator solution are metered in rapidly and the jacket temperature is increased to 85° C. in the course of 1.5 hours. The batch is stirred at this temperature for a further hour and then cooled and drained off. The final ethylene pressure is 14.5 bar.

Characteristic data:
Solids content: 44.7%
pH: 4.34
Viscosity: 5.86 Pa.s
Particle size distribution: 100–2200 nm
Ethylene content: 35%
Glass transition points: −26° C./11° C.

Example 7

10,800 g of water, 764 g of polyvinyl alcohol having a viscosity of a corresponding 4% strength aqueous solution at 20° C. of about 18 mPa.s and a degree of hydrolysis of about 88 mol %, 764 g of polyvinyl alcohol having a viscosity of a corresponding 4% strength aqueous solution at 20° C. of about 8 mPa.s and a degree of hydrolysis of about 88 mol %, 4.3 g of Texapon K12, 380 g of an aqueous 20% strength solution of Arkopal N300, 12.5 g of sodium disulfite and 50.8 g of sodium acetate are initially introduced into a 30 l pressure reaction vessel with a temperature-regulating device and stirrer. The reactor is flushed with nitrogen and ethylene to essentially remove the oxygen. The stirrer is then set at 150 revolutions/minute, 650 ml of vinyl acetate are metered in and the contents of the tank are heated to 40° C. 250 ml of the initiator solution of 50 g of ammonium peroxodisulfate and 1000 g of water are added rapidly at this temperature and the temperature is then increased to 60° C. During the heating-up phase, ethylene is forced in up to a pressure of 85 bar. A monomer mixture I comprising 2600 ml of vinyl acetate and 1900 ml of VeoVa10 is metered in linearly in the course of 6 hours. During this procedure, the ethylene supply is stopped after the end of the polymerization time of 6 hours. At the end of the polymerization phase of 6 hours, 50% of a monomer mixture II comprising 1860 g of vinyl acetate, 20 g of trimethoxyvinylsilane and 4 g of 2-hydroxyethylmethacrylate are metered in linearly in the course of two hours. The remaining 50% of the monomer mixture II are then metered in over a period of a further hour. In parallel with the monomer addition, 600 ml of initiator solution are metered in linearly over the entire period of 9 hours. After the end of the metering, the remaining 150 ml of initiator solution are metered in rapidly and the jacket temperature is increased to 85° C. in the course of 1.5 hours. The batch is stirred for a further hour at this temperature and then cooled and drained off. The final ethylene pressure is 12.7 bar.

Characteristic data:
Solids content: 46.2%
pH: 4.14
Viscosity: 11.6 Pa.s
Particle size distribution: 100–2200 nm
Ethylene content: 30.2%
Glass transition points: −28° C./8° C.

Example 8

10,800 g of water, 382 g of polyvinyl alcohol having a viscosity of a corresponding 4% strength aqueous solution at 20° C. of about 18 mPa.s and a degree of hydrolysis of about 88 mol %, 1146 g of polyvinyl alcohol having a viscosity of a corresponding 4% strength aqueous solution at 20° C. of about 8 mPa.s and a degree of hydrolysis of about 88 mol %, 4.3 g of Texapon K12, 380 g of an aqueous 20% strength solution of Arkopal N300, 12.5 g of sodium disulfite and 50.8 g of sodium acetate are initially introduced into a 30 l pressure reaction vessel with a temperature-regulating device and stirrer. The reactor is flushed with nitrogen and ethylene to essentially remove the oxygen. The stirrer is then set at 150 revolutions/minute, 640 ml of vinyl acetate are metered in and the contents of the tank are heated to 40° C. 250 ml of an initiator solution of 50 g of ammonium peroxodisulfate and 1000 g of water are added rapidly at this temperature and the temperature is then increased to 60° C. During the heating-up phase, ethylene is forced in up to a pressure of 85 bar. 4000 ml of vinyl acetate are metered in linearly in the course of 8 hours. During this procedure, the ethylene supply is stopped after a polymerization time of 6 hours. At the end of the 8-hour polymerization phase, a further 1000 ml of vinyl acetate are metered in linearly in the course of one hour. In parallel with the addition of vinyl acetate, 600 ml of initiator solution are metered in linearly over the entire period of 9 hours. After the end of the metering, the remaining 150 ml of initiator solution are metered in rapidly and the jacket temperature is increased to 85° C. in the course of 1.5 hours. The batch is stirred at this temperature for a further hour and then cooled and drained off. The final ethylene pressure is 19.9 bar.

Characteristic data:
Solids content: 46.0%
pH: 4.37
Viscosity: 4.46 Pa.s
Particle size distribution: 100–2200 nm
Ethylene content: 38.8%
Glass transition points: −26.6° C./10° C.

Example 9

10,800 g of water, 565 g of polyvinyl alcohol having a viscosity of a corresponding 4% strength aqueous solution at 20° C. of about 18 mPa.s and a degree of hydrolysis of about 88 mol %, 565 g of polyvinyl alcohol having a viscosity of a corresponding 4% strength aqueous solution at 20° C. of about 8 mPa.s and a degree of hydrolysis of about 88 mol %, 4.3 g of Texapon K12, 380 g of an aqueous 20% strength solution of Arkopal N300, 12.5 g of sodium disulfite and 50.8 g of sodium acetate are initially introduced into a 30 l pressure reaction vessel with a temperature-regulating device and stirrer. The reactor is flushed with nitrogen and ethylene to essentially remove the oxygen. The stirrer is then set at 150 revolutions/minute, 640 ml of vinyl acetate are metered in and the contents of the tank are heated to 40° C. 250 ml of an initiator solution of 50 g of ammonium peroxodisulfate and 1000 g of water are added rapidly at this temperature and the temperature is then increased to 60° C. During the heating-up phase, ethylene is forced in up to a pressure of 85 bar. 4000 ml of vinyl acetate are metered in linearly in the course of 8 hours. During this procedure, the ethylene supply is stopped after a polymerization time of 6 hours. At the end of the 8-hour polymerization phase, a further 1000 ml of vinyl acetate are metered in linearly in the course of one hour. In parallel with the addition of vinyl acetate, 600 ml of initiator solution are metered in linearly over the entire period of 9 hours. After the end of the metering, the remaining 150 ml of initiator solution are metered in rapidly and the jacket temperature is increased to 85° C. in the course of 1.5 hours. The batch is stirred at this temperature for a further hour and then cooled. The final ethylene pressure is 17.0 bar.

Characteristic data:

Solids content: 44.1% pH: 4.3

Viscosity: 2.91 Pa.s

Particle size distribution: 100–2200 nm

Ethylene content: 35.5%

Glass transition points: −25.7° C./8° C.

Comparison Example 1

A solution, brought to a pH of 5.0 with acetic acid, of 500 g of polyvinyl alcohol having a viscosity of a 4% strength aqueous solution at 20° C. of about 18 mPa.s and a degree of hydrolysis of about 88 mol %, 1000 g of polyvinyl alcohol having a viscosity of a 4% strength aqueous solution at 20° C. of about 8 mPa.s and a degree of hydrolysis of about 88 mol %, 50.8 g of anhydrous sodium acetate, 12.7 g of sodium disulfite and 8800 g of water is introduced into a 30 l pressure reaction vessel with a temperature-regulating device and stirrer. An emulsifier Texapon K12 (21 g) is additionally introduced into the initial mixture.

The reactor is flushed with nitrogen in order to remove essentially all the oxygen. The stirrer is then set at 150 revolutions/minute, 500 ml of vinyl acetate are added to the batch, the contents of the tank are heated to 40° C., 25% of a solution of 50 g of ammonium persulfate in 1000 g of water are added at 40° C. and the contents of the tank are heated to 60° C. No ethylene is added during the heating-up operation.

When an internal temperature of 60° C. is reached, the one-hour metering of 1500 ml of vinyl acetate is started at an internal temperature of 60° C. After the end of the metering, the ethylene pressure is brought to 85 bar and the remaining initiator solution is metered in linearly over a period of 6 hours in parallel with 3640 ml of vinyl acetate. When the vinyl acetate feed has ended after 6 hours, the ethylene supply is stopped and the mixture is allowed to after-react at 60° C. for one hour and the batch is then heated up to 85° C. in the course of 60 minutes and, when the reaction has ended, cooled after a further hour. The final ethylene pressure is 62.6 bar.

Characteristic data:

Solids: 46% pH: 4.2

Viscosity: 17.5 Pa.s

Particle size distribution: 100–1800 nm

Ethylene content: 36.3%

Glass transition points: −20°/26° C.

Comparison Example 2

(analogously to DE-C 22 14 410 hereby incorporated by reference)

A solution, brought to a pH of 5.0, of 7 g of sodium lauryl sulfate, 500 g of polyvinyl alcohol having a viscosity of a 4% strength aqueous solution at 20° C. of about 18 mPa.s and a degree of hydrolysis of about 88 mol %, 319 g of polyvinyl alcohol having a viscosity of a 4% strength aqueous solution at 20° C. of about 8 mPa.s and a degree of hydrolysis of about 88 mol %, 15.3 g of anhydrous sodium acetate, 12.5 g of sodium disulfite and 7700 g of water is introduced into a 30 l pressure reaction vessel with a temperature-regulating device and stirrer.

The reactor is flushed with nitrogen and ethylene to remove essentially all the oxygen. The stirrer is then set at 150 revolutions/minute, 760 g of vinyl acetate are added to the batch, the contents of the tank are heated to 40° C., a solution of 6 g of ammonium persulfate in 250 g of water is added at 40° C. and the contents of the tank are heated further to 60° C. During the heating-up operation, ethylene is added up to a pressure of 50 bar. When an internal temperature of 60° C. is reached, the eight-hour metering of 6880 g of vinyl acetate and of a solution of 14 g of ammonium persulfate in 600 g of water is started at an internal temperature of 60° C. under an ethylene pressure of 50 bar. When the metering has ended, a solution of 4 g of ammonium persulfate in 150 g of water is added to the batch and the mixture is after-heated at an internal temperature of 80° C. for 1.5 hours. The ethylene supply is then stopped and the dispersion is cooled to room temperature. The final ethylene pressure is 41 bar.

Characteristic data:

Solids content: 50.1% pH: 4.2

Viscosity: 4.0 Pa.s

Particle size distribution: 1200–1500 nm

Ethylene content: 24%

Glass transition point: −10° C.

B Preparation of the dispersion powders:

Experiments for preparation of the dispersion powders were carried out in a disk spray dryer (manufacturer Niro).

The designations for the powders correspond to the numbers of the examples.

The dispersions described in the examples were diluted with water to a solids content of 40% by weight before the spray drying. The experiments were carried out under approximately constant drying conditions. The gas intake temperatures were 110° C. and 120° C., the gas discharge temperature was about 75° C. and the sprayer disk speed was 23,000 revolutions/minute.

A kaolin derivative (china clay type) was used as an anticaking agent for Examples 1 to 5 and Comparison Examples 1 and 2, the addition of anticaking agent being adjusted to 12% by weight, based on the total dry product obtained. An aggregate of lime and dolomite was employed as the anticaking agent for Examples 6 to 9, the addition of anticaking agent being adjusted to 15% by weight, based on the total dry product obtained. The anticaking agent was added to the spray dryer above the sprayer disk via the drying gas. The results are summarized in Table 1 below.

TABLE 1

| Powder designation | Free-flowing properties | Storage stability [rating] | RAS test [mm] | | | |
|---|---|---|---|---|---|---|
| | | | 1 h | 2 h | 3 h | 24 h |
| Powder 1 | + | 2 | 5 | 10 | 18 | 45 |
| Powder 2 | + | 2 | 3 | 5 | 10 | 35 |
| Powder 3 | + | 2 | 7 | 16 | 28 | 74 |
| Powder 4 | + | 2 | 3 | 5 | 12 | 41 |

TABLE 1-continued

| Powder designation | Free-flowing properties | Storage stability [rating] | RAS test [mm] 1 h | 2 h | 3 h | 24 h |
|---|---|---|---|---|---|---|
| Powder 5 | + | 2 | 8 | 15 | 32 | 70 |
| Powder 6 | + | 2 | 1 | 1 | 2 | 8 |
| Powder 7 | + | 2 | 2 | 3 | 7 | 19 |
| Powder 8 | + | 3 | 1 | 3 | 5 | 15 |
| Powder 9 | + | 2 | 2 | 4 | 8 | 25 |
| Powder of Comparison Example 1 | − | 4 | 90 | 110 | 130 | 136 |
| Powder of Comparison Example 2 | + | 2 | 8 | 14 | 27 | 47 |

Free-flowing properties: + powder free-flowing, − powder not free-flowing
Storage stability: rating 1: very good, rating 5: deficient
RAS test: sediment height of a 0.5% strength redispersion after 1 hour, 2 hours, 4 hours and 24 hours (powders 1 to 5 and Comparison Examples 1 and 2 diluted starting from a 10% strength redispersion, powders 6 to 9 diluted starting from a 45% strength redispersion).

Use testing

The flexibility of sealing slurries was investigated in the following manner. A premix of 20% of Portland cement and 80% of quartz sand (particle size of 0.1–0.4 mm) was prepared. 75 parts of premix were then premixed in the dry state with 25 parts of the dispersion powder and the mixture was initially stirred with about 27 parts of water under a stirrer for 1 minute at a high shear rate. The water requirement was adjusted here, depending on the dispersion powder, such that a readily flowing mass formed without sedimentation. A test specimen about 200 cm$^2$ in size and 2 mm thick was produced on a polyethylene film using a template. This was then stored in a standard climate (23°±2° C., 50±5% relative atmospheric humidity) for at least one week. The flexibility test was then carried out as follows. The test specimen was cooled to a desired temperature and then bent with the smooth side successively around tubes of 8.2 cm, 6.2 cm, 3 cm and 2 cm diameter, starting with the largest diameter. The cracking or fracture of the test specimen was observed visually. It was ensured here that the tests were carried out quickly enough for the test specimen still to have the desired temperature.

Table 2 shows the results of the flexibility tests.

TABLE 2

| Temperature [°C.] | −5 | | | | −10 | | | | −15 | | | |
|---|---|---|---|---|---|---|---|---|---|---|---|---|
| Diameter [cm] Specimen | 8.4 | 6.2 | 3 | 2 | 8.4 | 6.2 | 3 | 2 | 8.4 | 6.2 | 3 | 2 |
| Powder 5 | + | + | + | + | + | + | + | + | + | + | + | + |
| Example 6 | + | + | + | + | + | + | + | | + | + | + | + |
| Powder 6 | + | + | + | + | + | + | + | + | + | + | + | + |
| Powder 7 | + | + | + | + | + | + | + | + | + | + | + | + |
| Powder 8 | + | + | + | + | + | + | + | + | + | + | + | + |
| Powder 9 | + | + | + | + | + | + | + | + | − | | | |
| Powder Comparison Example 2 | + | + | + | + | + | + | + | + | − | | | |

| Temperature [°C.] | −20 | | | | −25 | | | | −27 | | | |
|---|---|---|---|---|---|---|---|---|---|---|---|---|
| Diameter [cm] Specimen | 8.4 | 6.2 | 3 | 2 | 8.4 | 6.2 | 3 | 2 | 8.4 | 6.2 | 3 | 2 |
| Powder 5 | + | + | + | + | + | + | + | + | − | | | |
| Example 6 | + | + | + | + | + | + | + | + | + | + | + | + |
| Powder 6 | + | + | + | + | + | + | + | + | + | + | + | + |
| Powder 7 | + | + | + | + | + | + | + | + | + | + | + | + |
| Powder 8 | + | + | + | + | + | + | + | + | + | + | + | + |
| Powder 9 | | | | | | | | | | | | |

TABLE 2-continued

| | | | | | | | | | | | | |
|---|---|---|---|---|---|---|---|---|---|---|---|---|
| Powder 6 | + | + | + | + | + | + | + | + | + | + | + | + |
| Powder 7 | + | + | + | + | + | + | + | + | + | + | + | + |
| Powder 8 | + | + | + | + | + | + | + | + | + | + | + | + |
| Powder 9 | | | | | | | | | | | | |

| Temperature [°C.] | −29 | | | | −31 | | | | −33 | | | |
|---|---|---|---|---|---|---|---|---|---|---|---|---|
| Diameter [cm] Specimen | 8.4 | 6.2 | 3 | 2 | 8.4 | 6.2 | 3 | 2 | 8.4 | 6.2 | 3 | 2 |
| Example 6 | + | + | + | + | + | + | + | + | + | + | + | + |
| Powder 6 | + | + | + | + | + | + | + | − | | | | |
| Powder 7 | + | + | + | + | + | + | + | + | + | + | + | + |
| Powder 8 | + | + | + | + | + | + | + | + | + | + | + | + |
| Powder 9 | + | + | + | + | + | + | + | − | | | | |

| Temperature [°C.] | −35 | | | |
|---|---|---|---|---|
| Diameter [cm] Specimen | 8.4 | 6.2 | 3 | 2 |
| Example 6 | + | − | | |
| Powder 7 | − | | | |
| Powder 8 | − | | | |

+ Sealing slurries o.k.
− Fracture of the sealing slurries

The German Priority document of the present application, German Application 195 28 380, filed Aug. 2, 1995, is hereby incorporated by reference in its entirety.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A copolymer in dispersion or redispersible powder form which is stabilized by a protective colloid and has a glass transition temperature of −40° to 10° C. and an ethylene content of at least 30% by weight, based on the total weight of monomers used to make the copolymer, wherein the copolymer includes a heterogeneous build-up of copolymer particles, comprising a first copolymer phase, which comprises vinyl acetate and greater than 40% by weight of ethylene, based on the total weight of monomers used to make this phase, and a second copolymer phase, which comprises vinyl acetate and 5 to 40% by weight of ethylene, based on the total weight of monomers used to make this phase, and wherein the copolymer is stabilized by the protective colloid.

2. A copolymer as claimed in claim 1, wherein the glass transition temperature of the first phase copolymer is −30° to −10° C. and that of the second phase copolymer is 10° to 40° C., if polymerized separately.

3. A copolymer as claimed in claim 1, wherein the copolymer comprises 30 to 70% by weight of vinyl acetate and 30 to 70% by weight of ethylene, based on the total weight of monomers employed.

4. A copolymer as claimed in claim 1, which comprises, as the protective colloid, polyvinyl alcohol in an amount of 2 to 20% by weight, based on the total weight of the copolymer.

5. A copolymer as claimed in claim 1, wherein the first copolymer phase is partly crystalline.

6. A process for the preparation of a copolymer as claimed in claim 1, which comprises first copolymerizing a first portion of the monomers by free radical copolymerization under an ethylene pressure of 55 to 150 bar in the presence of the protective colloid to form the first phase, optionally subsequently polymerizing a further portion of the monomers, and then copolymerizing the remainder of the monomers by free radical copolymerization under an ethylene pressure of between 1 and 55 bar to form the second phase, and optionally then spray drying the product.

7. A process as claimed in claim 6, wherein the polymerization of the first portion of the monomers takes place under an ethylene pressure of 65 to 95 bar and that of the remainder portion takes place under an ethylene pressure in the range from 1 to 40 bar.

8. A process as claimed in claim 6, wherein up to 50% by weight of the monomers other than ethylene, are initially introduced into the reaction vessel and the remainder of the monomers are metered in during the polymerization.

9. A binder for building materials comprising a copolymer as claimed in claim 1.

10. A binder for sealing slurries comprising a copolymer as claimed in claim 1.

11. A copolymer as claimed in claim 1, which in addition to ethylene and vinyl acetate is formed from one or more monomers selected from the group consisting of vinyl esters, acrylic acid, acrylic acid esters, methacrylic acid, methacrylic acid esters, and maleic acid diesters.

12. A copolymer as claimed in claim 1, which is in the form of a dispersion.

13. A copolymer as claimed in claim 1, which is in the form of a redispersible powder.

14. A copolymer as claimed in claim 1, wherein the total amount of vinyl acetate and ethylene units based on the total weight of the copolymer is at least 50% by weight.

15. A copolymer as claimed in claim 1, which in addition to ethylene and vinyl acetate is formed from one or more of vinyl esters of aliphatic ($C_3$–$C_{18}$) carboxylic acids, acrylic acid esters, methacrylic acid esters and maleic acid diesters of aliphatic ($C_1$–$C_{18}$) alcohols, monomers which carry sulfonate groups, $\alpha,\beta$-unsaturated carboxylic acids, methacrylic acid esters or acrylic acid esters which carry epoxide or hydroxyl groups, monomers which carry N-methylol groups, and other monomers which can be copolymerized with these.

16. A copolymer as claimed in claim 1, where the protective colloid comprise polyvinyl alcohol.

17. A copolymer as claimed in claim 1, wherein the glass transition temperature of the first phase is –40° to 0° C. and that of the second phase is –10° to 50° C., if polymerized separately.

18. A copolymer as claimed in claim 1, which comprises 50 to 65% by weight of vinyl acetate and 35 to 50% by weight of ethylene, based on the total amount of monomers used to make the copolymer.

19. A copolymer as claimed in claim 1, which has a minimum film-forming temperature of less than 5° C.

* * * * *